United States Patent

Bell et al.

Patent Number: 5,771,750
Date of Patent: Jun. 30, 1998

[54] ADJUSTABLE CABLE CLIP

[75] Inventors: David John Bell, Grand Blanc; James Allen Morse, Canton; Michael Joseph Zaitz, Flint; Bernard Thomas Londeck, Waterford; Derek Ingham, Mt. Morris, all of Mich.

[73] Assignee: Delco Electronics Corporation, Kokomo, Ind.

[21] Appl. No.: 717,576

[22] Filed: Sep. 23, 1996

[51] Int. Cl.[6] .................................. G01D 5/04; F16C 1/22
[52] U.S. Cl. ...................... 74/502.6; 74/500.5; 116/28.1; 116/DIG. 20
[58] Field of Search ........................... 74/500.5, 501.5 R, 74/502.4, 502.6; 116/28.1, DIG. 20

[56] References Cited

U.S. PATENT DOCUMENTS

| | | | |
|---|---|---|---|
| 1,580,877 | 4/1926 | Barber | 74/502.4 X |
| 1,606,099 | 11/1926 | Rudolph | 74/502.6 X |
| 2,925,061 | 2/1960 | Thornburgh et al. | 116/DIG. 20 X |
| 3,084,659 | 4/1963 | Griffen | 116/DIG. 20 X |
| 3,319,598 | 5/1967 | Lorean | 116/28.1 |
| 4,788,881 | 12/1988 | Owen et al. | 116/28.1 X |
| 4,838,197 | 6/1989 | Watson | 116/28.1 |
| 4,955,251 | 9/1990 | Reinert et al. | 116/28.1 X |
| 5,000,059 | 3/1991 | Barnard | 74/500.5 X |
| 5,014,642 | 5/1991 | Owen et al. | 116/28.1 |
| 5,289,794 | 3/1994 | Jerro et al. | 116/28.1 |

Primary Examiner—Charles A. Marmor
Assistant Examiner—Mary Ann Battista
Attorney, Agent, or Firm—Jimmy L. Funke

[57] ABSTRACT

A clip for a shift indicator cable attaches the cable to the shift bowl of a vehicle. The clip is adjustable to align the indicator pointer to indicia. The clip comprises a bracket for attachment to the shift bowl and a lever which is attached to the cable end. The lever is pivoted at one end to the bracket and has a tang at the other end for engaging any of several slots in the bracket to latch the lever in any of several positions. Changing the lever position adjusts the cable.

4 Claims, 1 Drawing Sheet

ADJUSTABLE CABLE CLIP

FIELD OF THE INVENTION

This invention relates to a cable clip and particularly to an adjustable cable clip suitable for alignment of a shift indicator.

BACKGROUND OF THE INVENTION

In motor vehicles having an automatic transmission a shift indicator is used to display the current range. A mechanical shift indicator has stationary indicia representing the various ranges and a pointer movable along the indicia indicates which range is active. A steering column mounted shift mechanism includes a bowl rotatably mounted on the column and a shift lever for moving the bowl which is linked to the transmission. The bowl is also linked to the indicator by a cable attached at one end to the pointer and at the other end to a clip which is installed on the bowl.

During vehicle assembly an assembly person places the transmission shift lever in neutral and lines up the pointer with the "N" on the indicia. The clip is then pushed onto the shift bow. Incorrect alignment requires disengaging the clip from the bowl and repeating the process. This can occur several times and still may not result in satisfactory alignment. Moreover, the instrument panel containing the indicator may be only loosely installed during the clip installation stage and the indicator may change position when the panel is finally secured in place, causing pointer misalignment and subsequent adjustment or repair. It is desirable, therefore, to be able to easily and quickly adjust the pointer alignment during initial assembly as well as after complete assembly.

SUMMARY OF THE INVENTION

It is therefore an object of the invention to facilitate the adjustment of a transmission shift indicator. Another object is to adjust the end position of a cable attached to a mount.

A cable extending between a shift indicator pointer and a shift bowl is attached at one end to the bowl by an adjustable clip. The clip is fixed to the bowl in a position expected to align the pointer with the shift indicia. Errors in alignment are then corrected by adjusting the clip without removing the clip from the bowl. The clip includes a bracket which attaches to the shift bowl and a lever which is pivotally mounted at one end to the bracket. The other end of the lever has a tang which is inserted in one of several slots on the bracket to thereby afford a choice of lever positions. A crimp feature on the lever attaches to the cable end. The position of the cable end relative to the bowl is adjusted either during initial assembly or upon final assembly by releasing the lever tang from engagement with a slot, pivoting the lever to a new position and placing the tang in another slot to hold the cable end in the new position.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to an adjustable cable clip which is specifically developed for use in a shift indicator. It will be apparent, however, that the adjustable cable clip has other applications as well.

Figure 1:
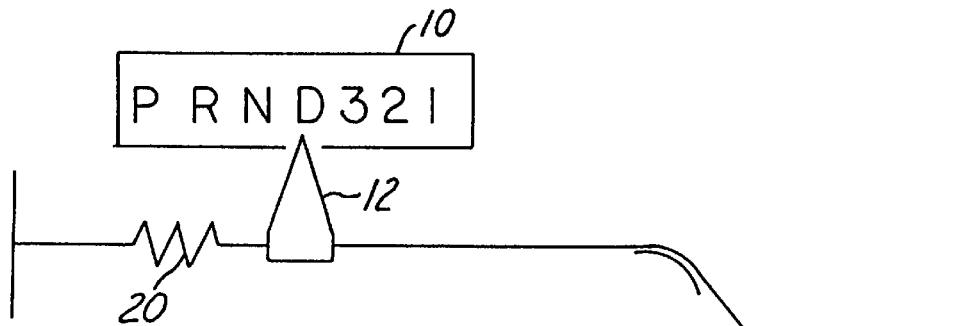
FIG. 1 is a schematic view of a conventional shift indicator assembly having a cable clip.

FIG. 1 shows a transmission position indicator assembly having graphic indicia 10 of transmission positions PRND321, a pointer 12 movable along the indicia 10, a shift bowl 14 rotatably mounted on the steering column, and a cable arrangement coupling the bowl 14 and the pointer 12. A clip 16 attached to the bowl holds one end of a cable 18 which is attached at the other end to the pointer 12. A spring 20 between the pointer and an anchor maintains tension of the cable to assure pointer movement for either direction of movement of the shift bowl 14. The clip 16, as known in the prior art, must be removed from the bowl and reattached to adjust the cable position and thus the pointer position.

Figure 2:
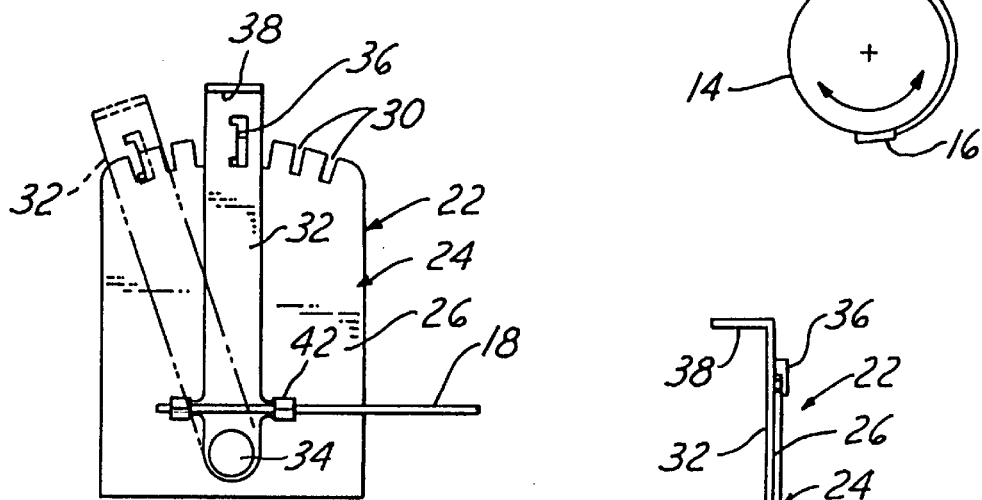
FIG. 2 is a front view of a cable clip according to the invention for use in the assembly of FIG. 1.
Figure 3:
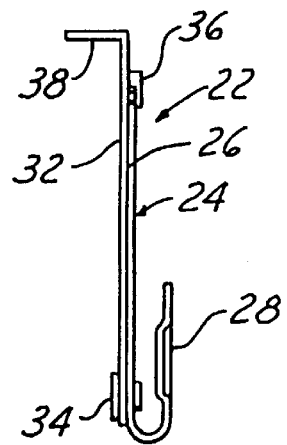
FIGS. 3 and 4 are side and isometric views, respectively, of the clip according to the invention.
Figure 4:
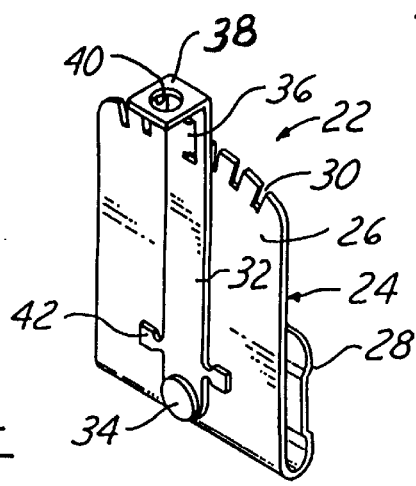

FIGS. 2, 3 and 4 show an adjustable sheet metal cable clip 22 for replacing the clip 16 of FIG. 1 to allow adjustment of the cable 18 and pointer 12 without removal from the bowl. The clip 22 has a bracket 24 having a front panel 26 and a U-shaped portion 28 for gripping an edge of the bowl. The panel 26 has an arcuate array of slots 30 on an edge opposite the U-shaped portion. A lever 32 is pivoted at one end to the panel 26 by a pivot pin or rivet 34. A tang 36 bent out of the lever near the other end extends at a right angle to the lever and is located to engage any of the slots 30; thus the tang and slots latch the lever at any slot position. The end of the lever 32 near the tang 36 terminates in a flange 38 which has a hole 40. Crimp tabs 42 on the lever between the pivot pin 34 and the tang 36 are crimped onto the cable end.

As shown in phantom lines in FIG. 2, the lever 32 can be latched in any position which has a corresponding slot 30 to retain the tang of the lever and is movable to any other like position. This is easily accomplished, even after vehicle assembly, by a tool (not shown) which can engage the hole 40 in the flange 38 to flex the lever sufficiently to withdraw the tang from its slot, move the lever to another position and allow the tang to enter another slot. Unless the lever is purposely adjusted on the bracket, its position is fixed to securely establish the pointer alignment relative to the indicia.

It will be recognized that certain modifications may be made within the spirit of the invention. For example, the crimp tab is shown close to the pivot pin but greater amount of cable adjustment is available by moving the tab farther from the pivot pin. Another modification would be to place the pivot point between the tang and the crimp tab.

It will thus be seen that the adjustable clip is inexpensive, simple in construction and easily employed to make rapid adjustment of cable position and indicator alignment. Since the clip does not have to be removed to accomplish the adjustment, the adjustment can be done without disassembly of the steering column and the repair time is dramatically reduced.

The embodiments of the invention in which an exclusive property or privilege is claimed are defined as follows:

1. In a transmission shift indicator assembly having an indicator coupled to an operator by a cable, a clip for adjustably anchoring one end of the cable to the operator for aligning the indicator, comprising:

a bracket for mounting to the operator;

an array of positioning features on the bracket;

a lever pivoted at one end to the bracket with the other end movable along the array of positioning features;

means on the other end of the lever for selectively engaging the positioning features for fixing the lever position;

and means for permanently fastening the cable directly to the lever at a fixed point between the ends;

whereby the cable position is adjusted relative to the operator by pivoting the lever about the one end and fixing the lever at a desired position.

2. The invention as defined in claim 1 wherein:

the array of positioning features comprises a series of slots in the bracket; and the means on the other end of the lever for selectively engaging the positioning features comprises a tang for coupling with one of the slots.

3. The invention as defined in claim 2 wherein the lever is a resilient sheet metal element sufficiently flexible to permit removing the tang from one of the slots and inserting in another of the slots for adjustment of the cable position.

4. The invention as defined in claim 1 wherein the means for fastening the cable to the lever comprises a tab on the lever which is crimped to the cable.

* * * * *